Jan. 5, 1926.  1,568,226
E. LARSON
AUTOMATIC CURRIER
Filed March 10, 1925   2 Sheets-Sheet 1
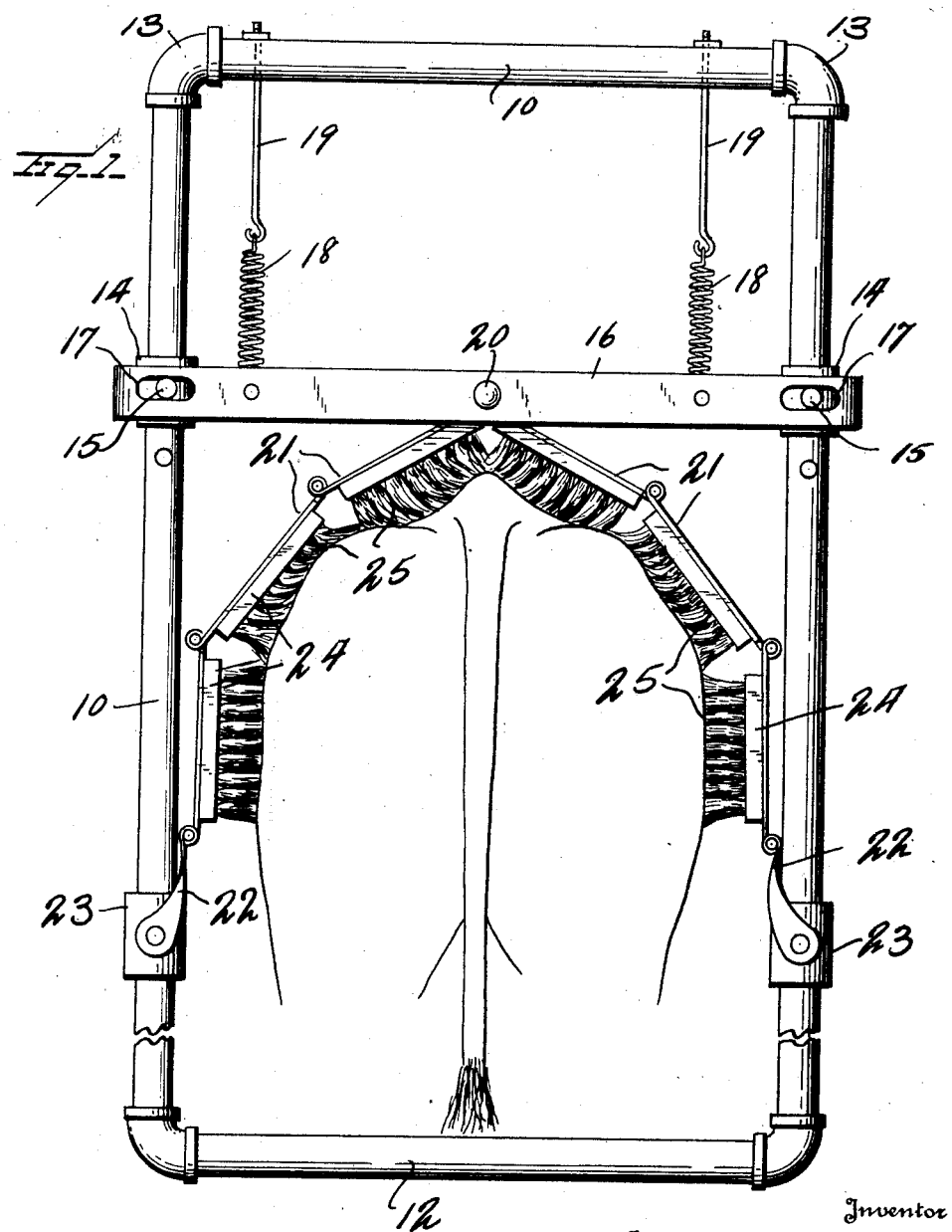

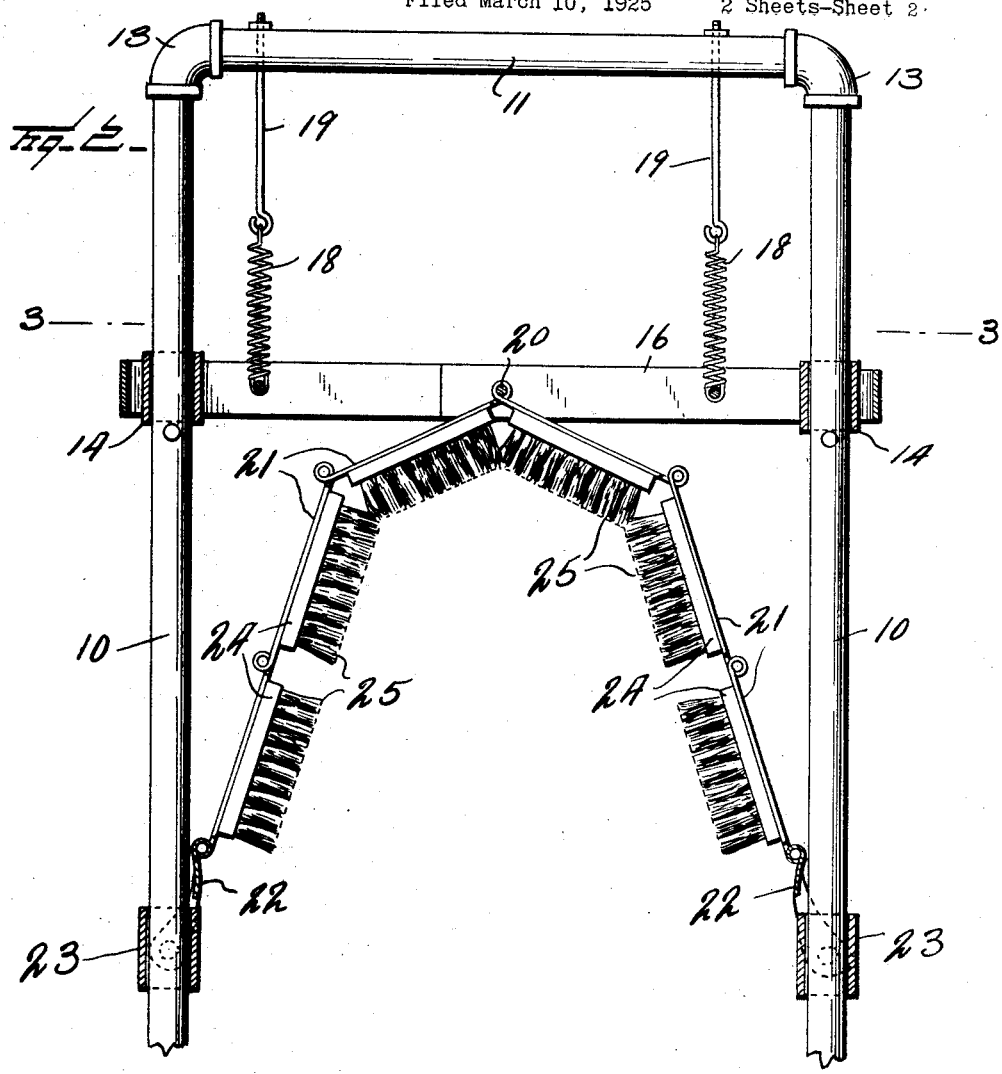
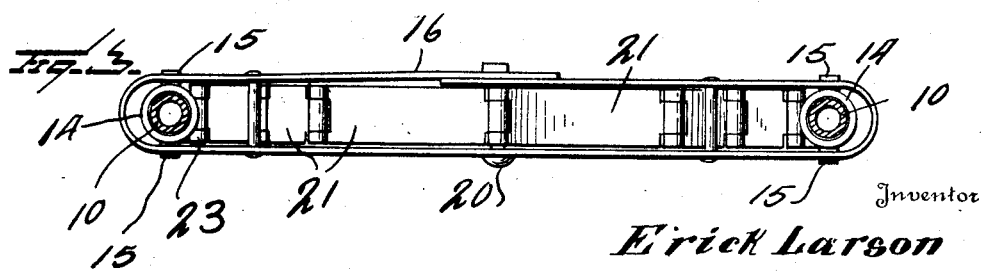

Patented Jan. 5, 1926.

1,568,226

UNITED STATES PATENT OFFICE.

ERICK LARSON, OF PAULLINA, IOWA.

AUTOMATIC CURRIER.

Application filed March 10, 1925. Serial No. 14,543.

*To all whom it may concern:*

Be it known that I, ERICK LARSON, a subject of the King of Sweden, residing at Paullina, in the county of O'Brien and State of Iowa, have invented certain new and useful Improvements in Automatic Curriers, of which the following is a specification, reference being had to the accompanying drawings.

This invention relates to devices for brushing or currying animals and the object of the invention is to provide a series of brushes disposed within a doorway or in the pathway of an animal, these brushes being so mounted that as the animal passes through the doorway the brushes will bear flexibly upon the back and sides of the animal, brushing them off and keeping them in good condition.

A further object is to provide a construction of this character including a frame upon which is mounted an upper sliding member and lower sliding members, the upper sliding member carrying and supporting a series of brushes flexibly connected to each other, the lower ends of the flexibly connected brushes being spread apart and held in proper position by slides.

A still further object is to provide a construction of this character wherein the series of brushes and the upper sliding bar above referred to are supported by means of springs so as to reduce the weight which has to be lifted by the animal as the animal passes through.

Other objects have to do with the details of construction and arrangement of parts as will appear more fully hereinafter.

My invention is illustrated in the accompanying drawings, wherein:—

Figure 1 is a front elevation of an automatic currier;

Figure 2 is a like view to Figure 1 but showing the upper end of the supporting frame, certain of the parts being in section;

Figure 3 is a section on the line 3—3 of Figure 2.

Referring to these drawings, it will be seen that I have illustrated a rectangular frame which, in the embodiment illustrated, is made up of iron pipe, though I do not wish to be limited to this. This frame consists of the sides 10, the cross bar 11, and the lower cross bar 12. The cross bars 11 and 12 are connected to the members 10 by means of elbows 13, though I do not wish to be limited to this, and obviously the member 12 may be omitted if this frame is mounted within a doorway as, for instance, the doorway of a barn. Mounted upon the vertical members 10 are two slides 14 which may be in the form of sleeves surrounding the pipe 10, and each of these sleeves or slides is provided with an outwardly projecting pin 15. Extending transversely across the frame is a bar 16 which, as illustrated, is in the form of a flattened ellipse and is made of strap iron, this bar at its ends extending around the sleeves and this bar being provided with slots 17 through which the pins 15 pass. Of course, the sleeves are independently movable and thus the bar is either movable upward on one side or the other or both sides. This bar may be supported by means of studs projecting from the side members 10 of the frame and engaging the sleeves or slides 14 to prevent the sleeves or slides from descending too low, but preferably the bar 16 will be suspended by means of the springs 18, these springs being connected to links 19 at their upper ends which extend up through perforations in the cross bar 11. These links 19 are headed so that they will not drop through these perforations, and thus it will be obvious that while the bar 16 may move upward freely, it will normally be suspended by and on these springs.

The middle of the bar 16 is provided with a transversely extending pin 20, and pivotally connected to this pin are two links 21 which extend downward and outward divergently from the pin and pivotally connect with other like links so that there is provided a flexible element extending downwardly and laterally from this pin 20, this flexible element being formed of a series of jointed or hinged sections. The lowermost plate or section 21 has flexibly connected to it the yoke or fork 22 whose lower end embraces the slides or sleeves 23 which slide up and down upon the rods 10. The two upper sections 21 are hingedly connected to each other but pivotally mounted upon the pin 20 so that these sections 21 simply oscillate upon the pin, but all the remainder of the sections are pivotally or hingedly connected to each other and thus the slides 23 act as weights tending to draw the lower sections into a straight line. Carried by the plates 21 are a series of brush backs 24 having downwardly projecting bristles 25. These bristles might be made of wire, broom corn, or other like materials.

The operation of this device will be obvious from the above description. The device is disposed, as before remarked, in a pathway or doorway so that as a cow, horse or other large animal passes into or out of the doorway its back will be swept by the bristles which project from the several brush backs, thus smoothing and currying the hair on the animal's back and flanks and keeping it in good condition, sweeping away insects and flies and to some extent ridding it of dirt. As the sections are flexibly connected to each other, it is obvious that they will give so that the several sections will more or less closely conform to the contour of the animal, and inasmuch as the bar 16 is suspended by the springs 18 the bar will lift very easily, and if the bar is lifted to a considerable extent the shanks 19 will slip upward through the cross bar 11. If the animal presses against one side of the device more than against the other, the two upper sections 21 will swing together upon the pivot 20 so that one will swing upward and the other will swing downward, thus permitting the brushes on one side to yield and on the other side to press closely to the animal, thus securing an application of the brushes to both flanks of the animal.

While I have illustrated details, it will be understood that I do not wish to be limited thereto and it will be obvious that this device may be mounted not only within a doorway but in a gate way leading from one field to another or may be simply set up in the midst of a field and the animals will avail themselves of the chance of passing through this device for the purpose of keeping flies and other insects off their coats.

I claim:—

1. A device of the character described including a supporting frame, a member slidably mounted upon the frame and having limited downward movement but movable freely upward on the frame, a series of flexibly connected, downwardly and laterally extending brushes having inwardly extending bristles, the uppermost brush being pivotally connected to said member, the lowermost brush of the series of brushes being slidingly engaged with the supporting frame on a level below said slidable member.

2. A device of the character described including a supporting frame, a member slidably mounted upon the frame and having limited downward movement but movable freely upward on the frame, a series of downwardly and laterally extending brushes flexibly connected to each other and having inwardly extending bristles, the series of brushes at their upper ends being connected to said slidable member and sliding members mounted upon the sides of the frame and with which the end brushes of the series are pivotally connected to thereby cause the brushes to form an arch across the frame.

3. A device of the character described comprising a supporting frame including opposed, vertical, parallel members, a series of flexibly connected brushes extending in an arch across the frame and slidably engaged with the vertical members, and means acting to support the middle of the arch formed by the brushes, said means being vertically movable.

4. A device of the character described including a supporting frame having parallel, vertical members, a bar extending transversely of the frame and slidably engaged with the supporting members, means limiting the downward movement of the bar, a series of flexibly connected brushes arranged in the form of an arch and extending across the frame, the brushes at the middle of the arch being pivotally connected to said sliding bar and at the ends of the arch having operative sliding engagement with the vertical members.

5. A device of the character described comprising a frame including vertical members, a transversely extending bar, vertical slides mounted upon the vertical members and with which said bar is loosely connected, means limiting the downward movement of the bar but permitting its free upward movement, a series of flexibly connected brushes, the series being pivotally connected at its middle to the middle of the bar and the brushes extending downward and outward laterally in opposite directions therefrom, and slides mounted upon the vertical members and with which the ends of the series of brushes are pivotally connected.

6. A device of the character described comprising a rectangular frame, a cross bar extending transversely of the frame and having sliding engagement at its ends with the frame, springs supporting the cross bar, a series of flexibly connected brushes arranged as an arch, the middle of the series being pivotally connected to said cross bar and the ends of the series extending downward and outward, the brushes having inwardly extending bristles, and slides mounted upon the vertical members and with which the end brushes of the series are pivotally connected.

7. A device of the character described comprising a rectangular frame, slides mounted upon the frame and having outwardly projecting studs, a cross bar having slides engaging said studs, supporting springs connected to the upper end of the frame and yieldingly supporting said cross bar, a pair of brushes rigidly connected to each other at an angle and pivotally engaged with the cross bar at the middle thereof, a series of flexibly connected brushes flexibly connected to said middle brushes and extending downwardly and laterally therefrom, forks mounted upon the lower ends of the end brushes of the series, and slides mounted upon the vertical members and with which said forks pivotally engage.

8. Means for brushing animals including an arcuately disposed series of brushes having inwardly projecting bristles, the brushes being flexibly connected to each other and yieldingly supported for bodily movement in a vertical plane.

In testimony whereof I hereunto affix my signature.

ERICK LARSON.